United States Patent [19]
Mochizuki et al.

[11] Patent Number: 5,435,795
[45] Date of Patent: Jul. 25, 1995

[54] VEHICLE DRIVETRAIN CONTROL INCLUDING CVT

[75] Inventors: Nobuaki Mochizuki; Hirofumi Okahara, both of Isehara; Seiji Kaminaga, Fuji, all of Japan

[73] Assignee: Nissan Motor Co., Ltd., Yokohama, Japan

[21] Appl. No.: 208,221

[22] Filed: Mar. 10, 1994

[30] Foreign Application Priority Data

Mar. 10, 1993 [JP] Japan .................................. 5-076130

[51] Int. Cl.⁶ .............................................. B60K 41/14
[52] U.S. Cl. ...................................... 477/39; 477/40; 477/43
[58] Field of Search ........................ 477/38, 39, 40, 43, 477/47

[56] References Cited

U.S. PATENT DOCUMENTS

| | | | |
|---|---|---|---|
| 4,598,611 | 7/1986 | Frank | 477/39 |
| 4,735,113 | 4/1988 | Yamamuro et al. | |
| 4,823,267 | 4/1989 | Kumura | 477/40 X |
| 5,056,637 | 10/1991 | Miyawaki et al. | 477/39 |
| 5,067,372 | 11/1991 | Suzuki | |

FOREIGN PATENT DOCUMENTS

61-105351  5/1986  Japan .
62-156036 10/1987  Japan .

*Primary Examiner*—Charles A. Marmor
*Assistant Examiner*—Peter Kwon
*Attorney, Agent, or Firm*—Foley & Lardner

[57] ABSTRACT

A vehicle drivetrain control system reduces the torque of a clutch to a desired level determined as a function of the engine speed during a predetermined period of time initiated by depression of a foot brake. The function is representative of torque versus engine speed characteristic of the drivetrain during coasting operation.

11 Claims, 11 Drawing Sheets

VEHICLE DRIVETRAIN CONTROL INCLUDING CVT

BACKGROUND OF THE INVENTION

The present invention relates to a vehicle drivetrain control including a continuously variable transmission (CVT).

U.S. Pat. No. 4,735,113, issued to Yamamuro et al. on Apr. 5, 1988 discloses a continuously variable transmission incoporated in a transaxle drivingly connected traction road wheels of a vehicle. According to this drivetrain, for forward drive, a forward clutch is kept engaged to transfer the engine power to the CVT input shaft rotatable with a driver pulley. Under condition where the traction road wheels are locked to hold the CVT output shaft stationary, the CVT is subject to a stress if engine power is kept applied to the CVT input shaft. This stress, if great, induces occurrence of a slip of the V-belt relative to the pulleys.

An object of the present invention is to improve a vehicle drivetrain including a continuously variable transmission such that the amount of stress which the transmission is subject to is decreased to a sufficiently low level without degrading drive feel of the vehicle.

SUMMARY OF THE INVENTION

The present invention uses improved controller means which generates a desired torque command as a function of the engine speed, the function representing torque versus engine speed characteristic of the vehicle drivetrain during coasting operation. The controller means determines the initiation of and the termination of a predetermined period of time when there is increased possibility that the traction road wheel is locked and determines the control signal in response to the desired torque during the predetermined period of time.

According to another aspect of the present invention, there is provided a control method compsiring the steps of:

generating a desired torque command as a function of the engine speed, the function representing torque versus engine speed characteristic of the vehicle drivetrain during coasting operation;

determining the initiation of and the termination of a predetermined period of time when there is increased possibility that the traction road wheel is locked; and determining the control signal in response to the desired torque during the predetermined period of time.

DETAILED DESCRIPTION OF THE INVENTION

Figure 1:
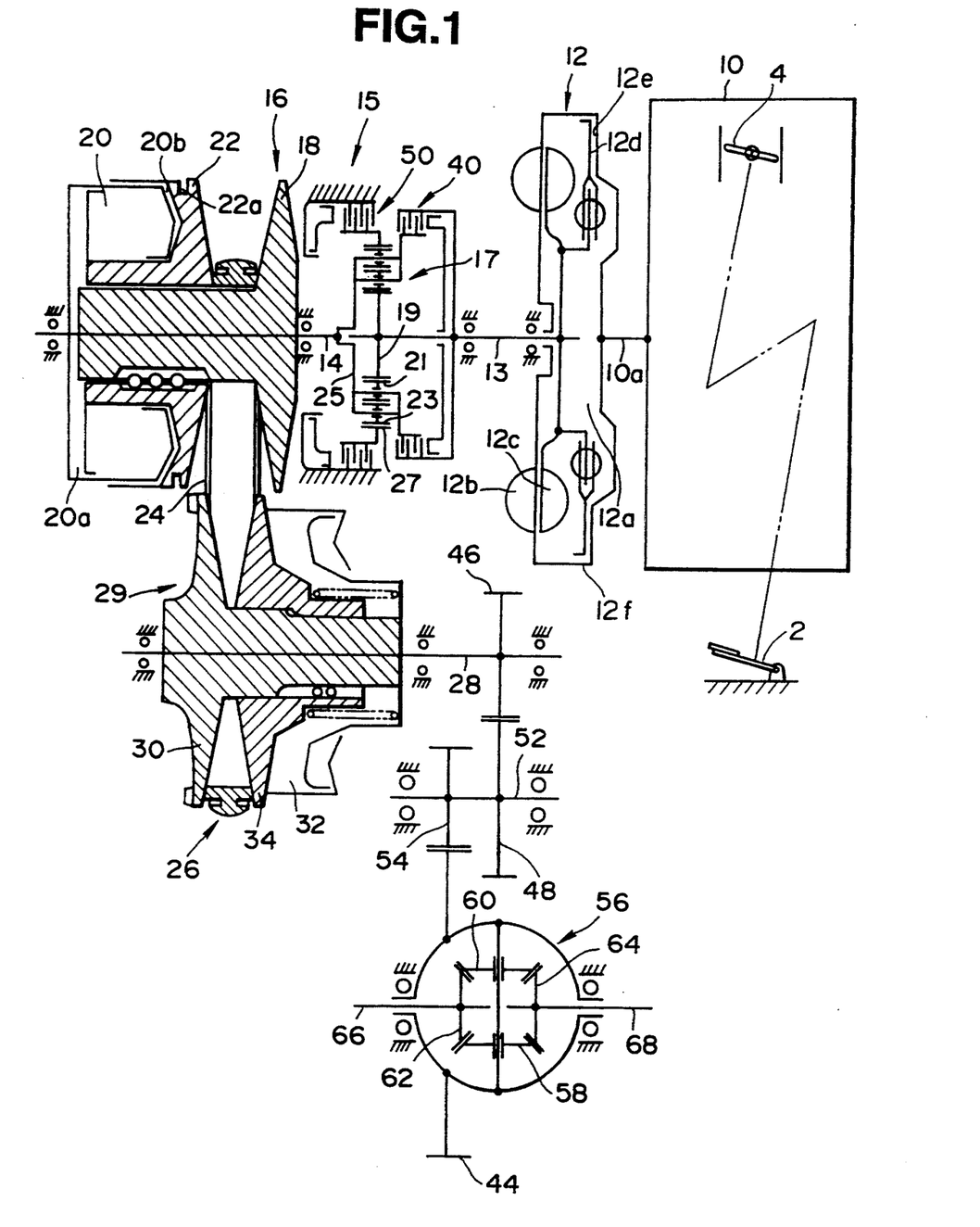
FIG. 1 is a schematic view of a continuously variable transmission (CVT) incorporated in a transaxle drivingly connected to an engine.

Referring to FIG. 1, a block 10 represents an engine. The engine 10 has a throttle 4 which opens in degrees in response to depressed position of a gas pedal 2. Although not shown in FIG. 1, there is arranged an accelerator switch 998 (see FIG. 3) which is turned on when the gas pedal 2 is depressed and turned off when it is released. The engine 10 is drivingly connected to a hydrokinetic torque transmitting unit in the form of a fluid coupling 12 of the lock-up type including a lock-up piston 12d. The fluid coupling 12 is drivingly connected to a continuously variable transmission (CVT) 29. This connection can be interrupted when a forward clutch 40 is disengaged with a reverse brake 50 released. The forward clutch 40, the reverse brake 50 and a planetary gearing 17 cooperate with each other to form a forward/reverse change-over mechanism 15.

For forward drive, the forward clutch 40 is engaged with the reverse brake 50 released, while for reverse drive, the reverse brake 50 is applied with the forward clutch 40 disengaged. The transmission 29 is drivingly connected to a final drive 56. The CVT 29 includes a driver pulley 16, a follower pulley 26 and a V-belt 24. It will be understood that the present invention is not limited to the use of CVT's with pulley V-belt power transfer. The present invention is operational with any other type of CVT in which the torque can be transmitted through frictional contact, including traction drive type CVT's.

Figure 2A:
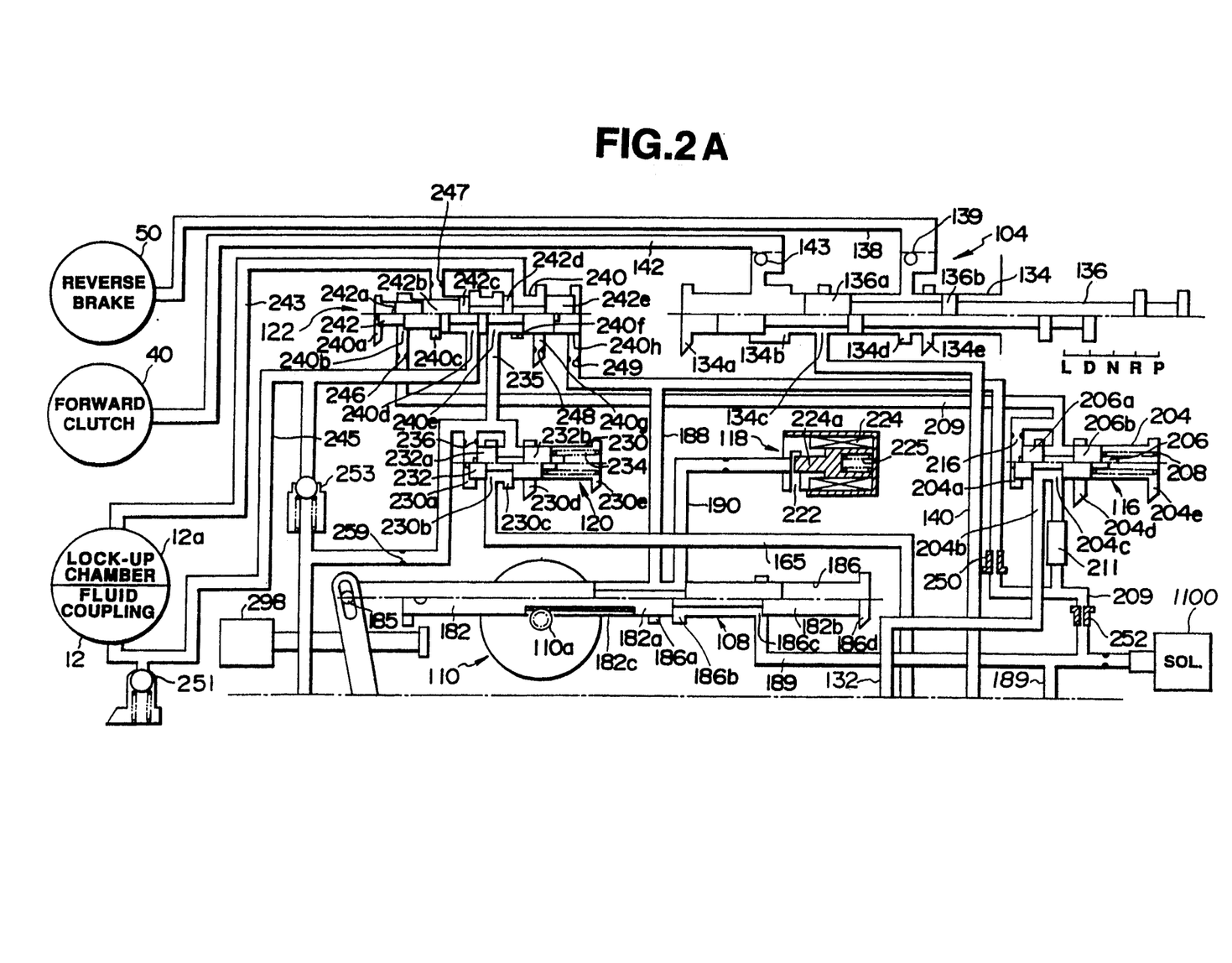
FIGS. 2A and 2B, when combined, are a hydraulic circuit of a hydraulic control system.
Figure 2B:
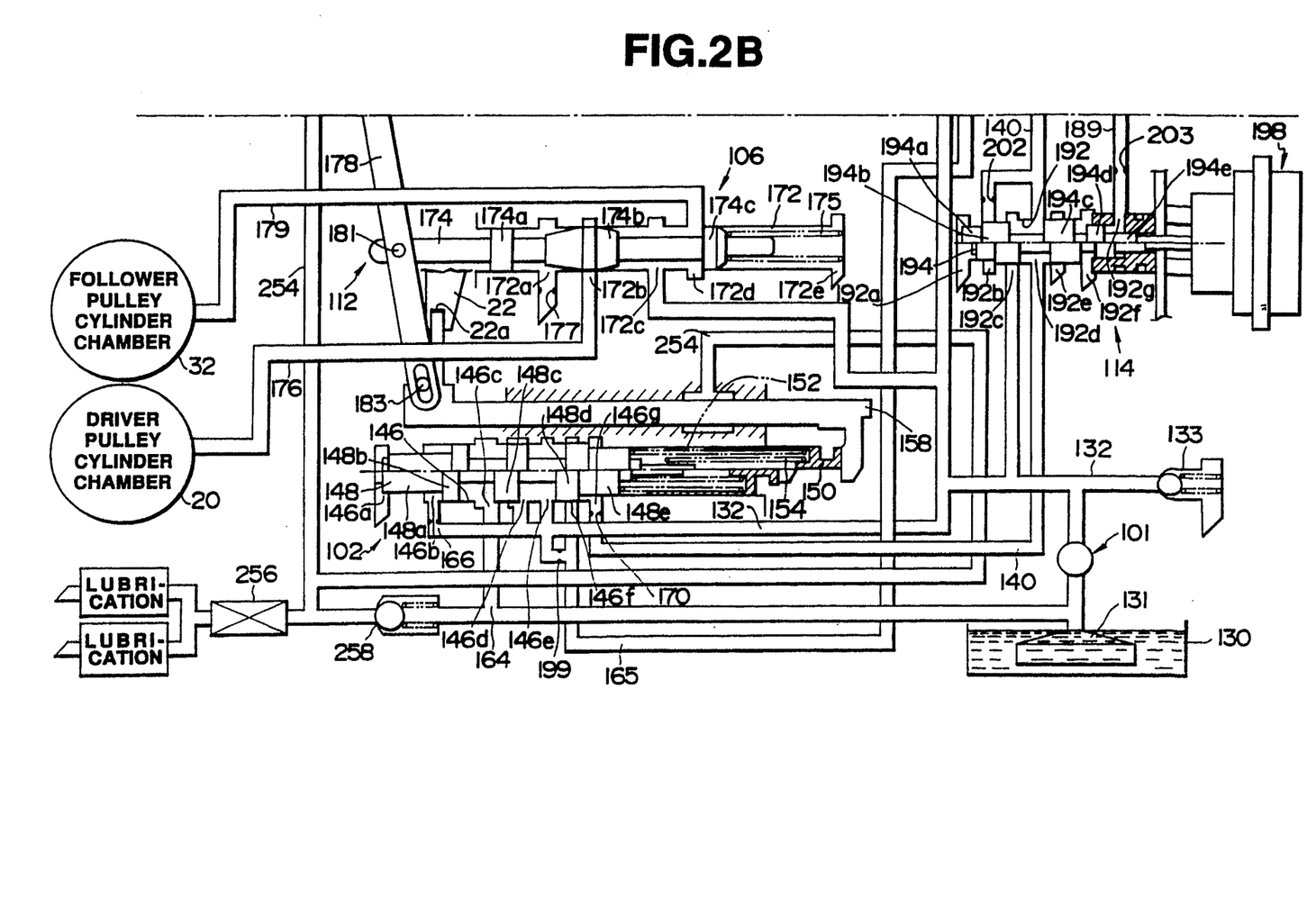

Referring to FIGS. 2A and 2B, the hydraulic control system includes a manual selector valve 104 manually operable by the vehicle operator to any one of desired positions (e.g., L, D, N, R, P), an actuator in the form of a stepper motor 110, a ratio control element in the form of a rod 182 connected by rack and pinion to the stepper motor 110. The stepper motor 110 is under the control of a CVT controller 300.

In response to a control signal from the CVT controller 300, the stepper motor 110 moves the rod 182. The rod 182 moves a lever 178. The lever 178 is pivotally connected to the rod 182 at one end and to a positionable or axially moveable conical disc 22 of the driver pulley 16 at the other end. At a point between the two ends, the lever 178 is pivotably connected to a valve spool 174 of a shift control valve 106. This arrangement provides position feedback of the pulley to the valve. As the stepper motor 110 moves the lever 178, the shift control valve 106, in response to the movement of the valve spool 174, alters the hydraulic pressure in a hydraulic conduit 176 leading to the driver pulley cylinder chamber 20. The hydraulic pressure in a hydraulic conduit 179 leading to the follower pulley cylinder chamber 32 is unaltered and kept as high as the hydraulic pressure generated by a line pressure regulator valve 102. As the hydraulic pressure in the hydraulic conduit 176 is altered, the conical disc 22 moves. Movement of the conical disc 22 causes the V-belt 24 to move a conical disc 34 of the follower pulley 26. This causes the reduction ratio, i.e., a ratio of the input speed to the output speed, of the CVT 29 to change. As the conical disc 22 moves, the lever 178 moves, repositioning the valve spool 174, providing a means for the valve 106 to stop the positionable conical discs 22 and 34 from moving.

For supplying hydraulic pressure to the fluid coupling 12, there is a coupling pressure regulator valve 120. This valve 120 is supplied with hydraulic fluid under the line or system pressure generated by the line pressure regulator valve 102 through a hydraulic fluid conduit 165. Pressure regulation is effected in this valve 120 to generate a constant hydraulic pressure in a hydraulic fluid conduit 235 leading to a lock-up control valve 122. The lock-up control valve 122 includes a spool 242 having a land 242a defining a pressure acting area exposed to hydraulic pressure supplied to a port 240b by a hydraulic fluid conduit 209. On a righthand end, viewing in FIG. 2A, the spool 242 is exposed to hydraulic pressure supplied to a port 240h by a hydraulic fluid conduit 188. The lock-up control valve 122 has a lock-up off command position as illustrated by the upper half of the spool 242, viewing in FIG. 2A, and a lock-up on command position as illustrated by the lower half of the spool 242, viewing in FIG. 2A. In the lock-up off command position, the hydraulic fluid conduit 235 is allowed to communicate with a hydraulic fluid conduit 243 leading to a lock-up chamber 12a of the interior of the fluid coupling 12, while a hydraulic fluid conduit 245 communicating with the interior of the fluid coupling 12 is closed, causing the lock-up piston 12d to assume a clutch disengaged position thereof. In the lock-up on command position, the hydraulic fluid conduit 245 is allowed to communicate with the conduit 235, while the hydraulic fluid conduit 243 is drained via a drain port 240g. This causes the lock-up piston 12d to assume a clutch engaged position thereof. Owing to the fact that the pressure acting area on the righthand end of the spool 242 is larger than the pressure acting area defined by the land 242a, the spool 242 assumes the lock-up off command position when the hydraulic pressure at the port 240h is as high as the hydraulic pressure at the port 240b, while it assumes the lock-up on command position when the hydraulic pressure at the port 240h drops. The hydraulic fluid conduit 188 communicates via a choke or flow restrictor 250 with the hydraulic fluid conduit 209. A constant hydraulic fluid pressure builds up in the hydraulic fluid conduit 209 owing to a constant pressure regulator valve 116. The hydraulic pressure within the hydraulic fluid conduit 188 is controlled by a solenoid valve 118 operated by a lock-up solenoid 224. When the lock-up solenoid 224 is out of duty and deenergized, the valve 118 closes a drain port of a drain hydraulic conduit 190. When the lock-up solenoid 224 is on duty and energized, the valve opens the drain port of the drain conduit 190. Since the drain conduit 190 is allowed to communicate with the hydraulic fluid conduit 188 while the rod 182 operates in the normal stroke range, the hydraulic pressure at the port 240h becomes as high as the hydraulic pressure at the port 240b when the lock-up solenoid 224 is deenergized, while the hydraulic pressure at the port 240h drops to zero when the lock-up solenoid 224 is energized. This solenoid 224 is controlled in accordance with a lock-up duty (DUTY) determined by the CVT controller 300.

Figure 5:
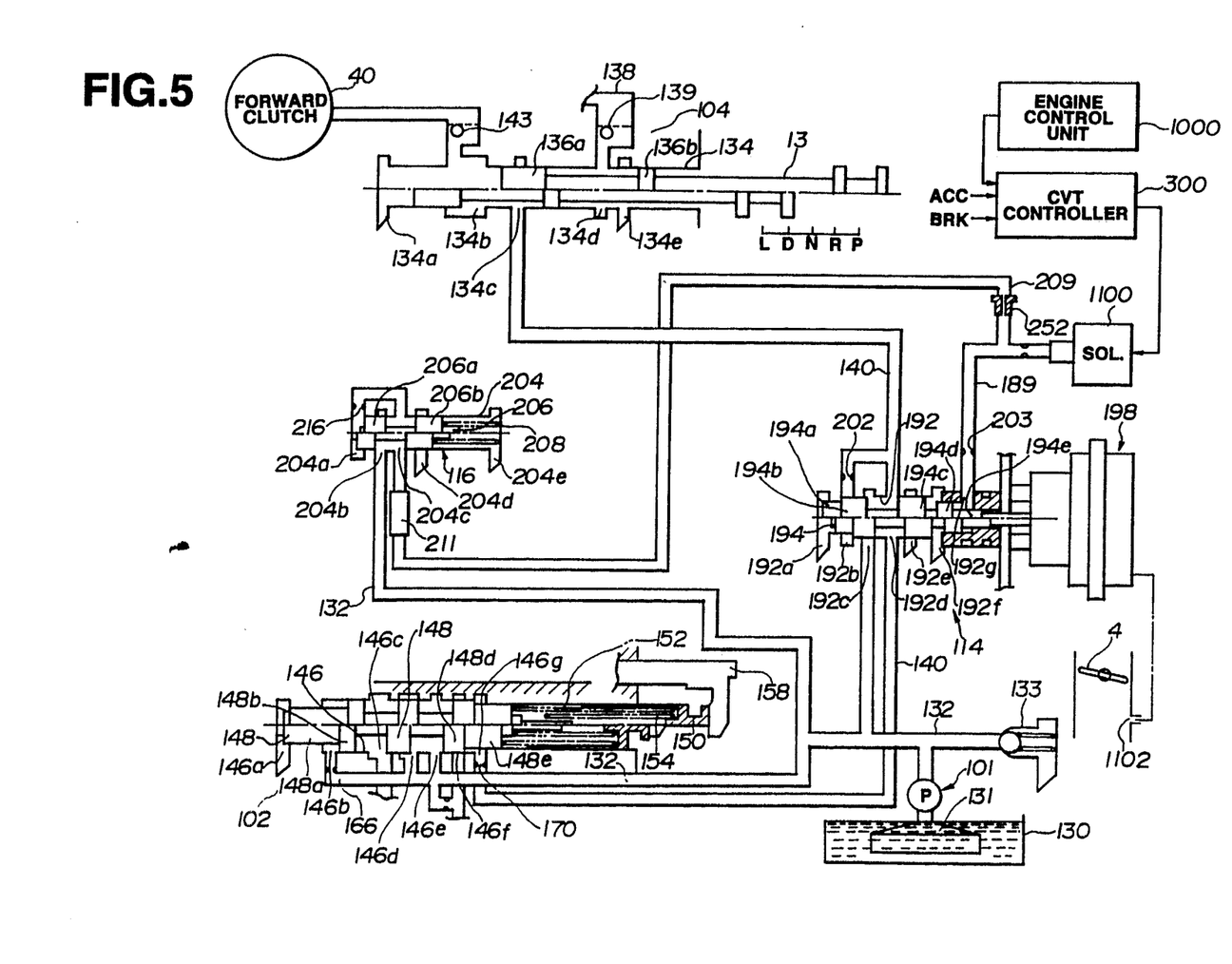
FIG. 5 is a fragmentary view of the hydraulic circuit shown in FIGS. 2A and 2B.

Referring also to FIG. 5, it is now explained below regarding the manner of controlling hydraulc pressure on which the forward clutch 40 is engaged. The line pressure regulator valve 102 generates the line pressure within a hydraulic fluid conduit 132 which leads to the constant pressure regulator valve 116. This hydraulic fluid conduit 132 lead to a throttle pressure 114. The constant pressure regulator valve 116 effects pressure regulation to generate the constant hydraulic pressure within the hydraulic fluid conduit 209. The hydraulic fluid conduit 209 communicates via a choke 252 with a hydraulic fluid conduit 189 communicating with a port 192g of the throttle valve 114. This hydraulic fluid conduit 209 has a drain port that is normally closed by a solenoid valve including a clutch control solenoid 1100. When the clutch control solenoid 1100 is in duty and energized, the solenoid valve opens the drain port. The percent of duty (DUTYTH) of the clutch control solenoid 1100 over unit time is determined by the CVT controller 300. The throttle valve 114 has a vacumm diaphragm 198 and a spool 194 connected to the diaphragm 198. The spool 194 has a land 194d exposed to a hydraulic fluid pressure at the port 192g communicating with the hydraulic fluid conduit 189. The vacuum diaphragm 198 communicates with a vacuum port 1102 (see FIG. 5) opening to the intake manifold downstream of the throttle flap 4, and biases the spool 194 to the left, viewing in FIG. 5, as the manifold pressure increases toward the atmospheric level. The throttle valve 114 effects pressure regulation to generate a throttle fluid pressure within a hydraulic fluid conduit 140. The hydraulic fluid conduit 140 communicates with a port 134c of the manual selector valve 104. When the manual selector valve 104 is positioned at the forward drive range position "L" or "D", the port 134c is allowed to communicate with a port 134b, thus allowing supply of throttle fluid pressure to the forward clutch 40.

Figure 10:
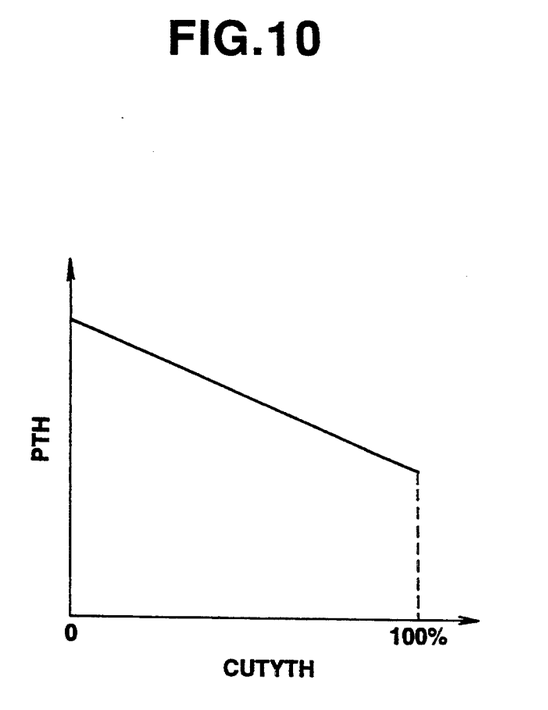
FIG. 10 is a conversion map illustrating the relationship between duty and pressure.

The throttle fluid pressure is proportional to the bias force applied to the spool 194 by the vacuum diaphragm 198 and also to the hydraulic fluid pressure supplied to the port 192g by the hydraulic fluid conduit 189. The setting of the vacuum diaphragm 198 is such that it applies no bias force to the spool 194 when the manifold pressure is lower than a predetermined vacuum level, but the bias force is proportional to the manifold pressure when the manifold pressure is greater than the predetermined vacuum level. Thus, when the manifold pressure stays lower than the predetermined vacuum level owing to the closing of the throttle flap 4, the throttle fluid pressure is controlled by the hydraulic fluid pressure supplied to the port 192g by the hydraulic fluid conduit 189. In other words, the hydraulic fluid pressure supplied to the forward clutch 40 is controlled by varying the percent of duty of the clutch control solenoid 1100. The relationship between the throttle fluid pressure (PTH) and the percent of duty (DUTYTH) of the clutch control solenoid 1100 is illustrated in FIG. 10. The duty (DUTYTH) of the clutch control solenoid 1100 is determined by the CVT controller 300.

It is now understood from the preceding description that the reduction ratio of the CVT 29 is controlled by the stepper motor 110, the lock-up operation of the fluid coupling 12 is controlled by the lock-up solenoid 224 and the degree of engagement of the forward clutch 40 is controlled by the clutch control solenoid 1100.

Figure 3:
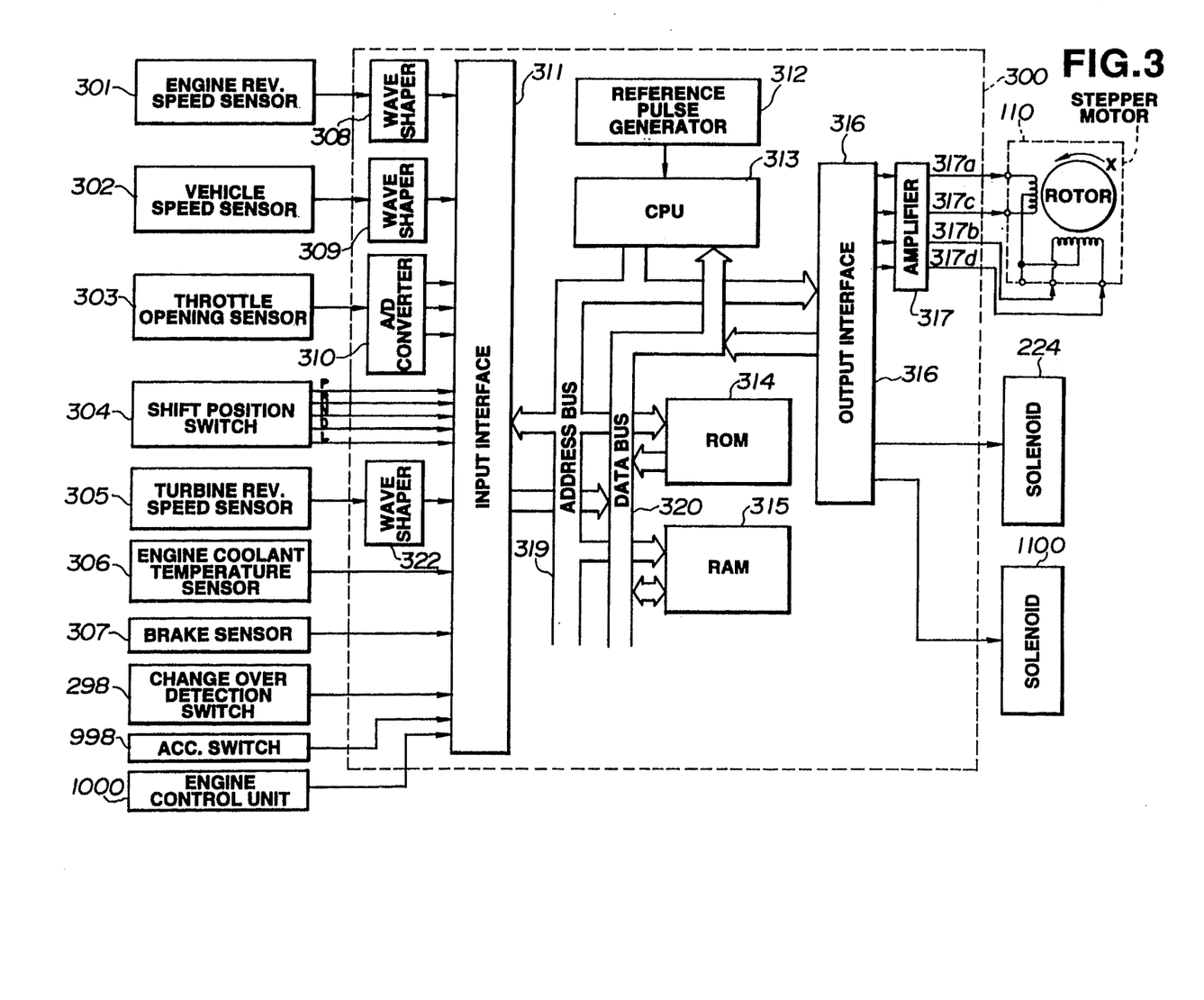
FIG. 3 is a block diagram of a CVT controller in association with an engine controller.

Referring to FIG. 3, the CVT controller 300 receives information from various sensors and switches. They include an engine revolution speed sensor 301, a vehicle speed sensor 302, a throttle opening sensor 303, and a shift position switch 304. The engine speed sensor 301 generates an engine speed signal. (NE) indicative of the revolution speed of the engine output shaft 10a. The vehicle speed sensor 302 detects the revolution speed of an output shaft 28 of the CVT 29 and generates a vehicle speed signal (V) indicative of the detected revolution speed of the CVT output shaft 28. The throttle sensor 303 detects the opening degree of the the throttle 4 and generates a throttle opening degree signal (TH) indicative of the detected opening degree of the throttle 4. The shift position switch 304 gives a shift position signal representative of which one of various positions the manual selector valve 104 is positioned to. These signals are input to the controller 300. The CVT controller 300 outputs a control signal. This control signal is applied to a driver circuit for the stepper motor 110. Specifically, in response to the signals from the various sensors and switches, the controller 300 determines and outputs a pulse mumber (PA) as the control signal. Application of the control signal to the driver circuit turns the stepper motor 110 and thus moves the rod 182 to a ratio command position corresponding to the determined pulse number.

The CVT controller 300 determines the duty (DUTY) of the lock-up solenoid 224 in response to the vehicle speed signal (V) from the vehicle speed sensor 302. Briefly, the duty is set equal to 0% when the vehicle speed is still lower than a lock-up on vehicle speed. The duty switches to 100% when the vehicle speed increases beyond the lock-up on vehicle speed. Subsequently, if the vehicle speed drops below a lock-up off vehicle speed that is lower than the lock-up on vehicle speed, the duty is set to 0% again.

In order to determine the duty (DUTYTH) of the clutch control solenoid 1100, the CVT controller 300 receives information from a brake sensor 307, the accelerator switch 998 and an engine control unit 1000 for the engine 10. The engine control unit 1000 generates a signal (FUELCUT) which takes 0 (zero) level when all of the engine cylinders are supplied with fuel. This signal (FUELCUT) takes 1 (one) level when some or all of the engine cylinder are not supplied with fuel. The brake sensor or switch 307 is turned off when the foot brake 1104 is released and turned on when it is depressed. Thus, the brake switch 307 generates a signal (BRK) which changes from a "0" (zero) level to a "1" (one) level upon depression of a foot brake 1104 (see FIG. 4) and then returns to the "0" level upon release of the foot brake 1104. The accelerator switch 998 generates a signal (ACC) which changes from a "1" (one) level to a "0" (zero) level upon release of the gas pedal 2 and then returns to the "1" level upon subsequent depression of the gas pedal 2.

Detailed description of FIGS. 1, 2A, 2B and 3 is found in U.S. Pat. No. 5,067,372 issued on Nov. 26, 1991 in the name of Suzuki and assigned to the common assignee to which the present application is to be assigned, which patent is hereby incorporated by reference partially with respect to the description regarding FIGS. 1, 2A, 2B and 3 thereof. The above described hardware is substantially the same as a hardware explained in the patent in connection with FIGS. 1, 2A, 2B and 3 except that the hydraulic fluid pressure within the hydraulic fluid line 189 is controlled by the clutch control solenoid 1100 which is independent from the lock-up solenoid 224, while, according to U.S. Pat. No. 5,067,372, a single solenoid 224 is responsible not only for lock-up control, but also for pressure control within a hydraulic fluid conduit 189. Another difference resides in addition of the accelerator switch 988 and the engine control unit 100 to give further information to the CVT controller 300 and removal of an idle switch 350 (see FIG. 3 of U.S. Pat. No. 5,067,372). For further understanding of the components parts which have been briefly described or not described, reference is made to this patent.

For further understanding of the lock-up control and ratio control, reference should be made to U.S. Pat. No. 4,735,113 issued on Apr. 5, 1988 to Yamamuro et al. Particularly, reference should be made to the descriptive part in connection with FIGS. 4 and 5 of the U.S. Pat. No. 4,735,113, which patent is hereby incorporated.

The implementation of the present invention into the above described hardware will be further explained below.

Figure 4:
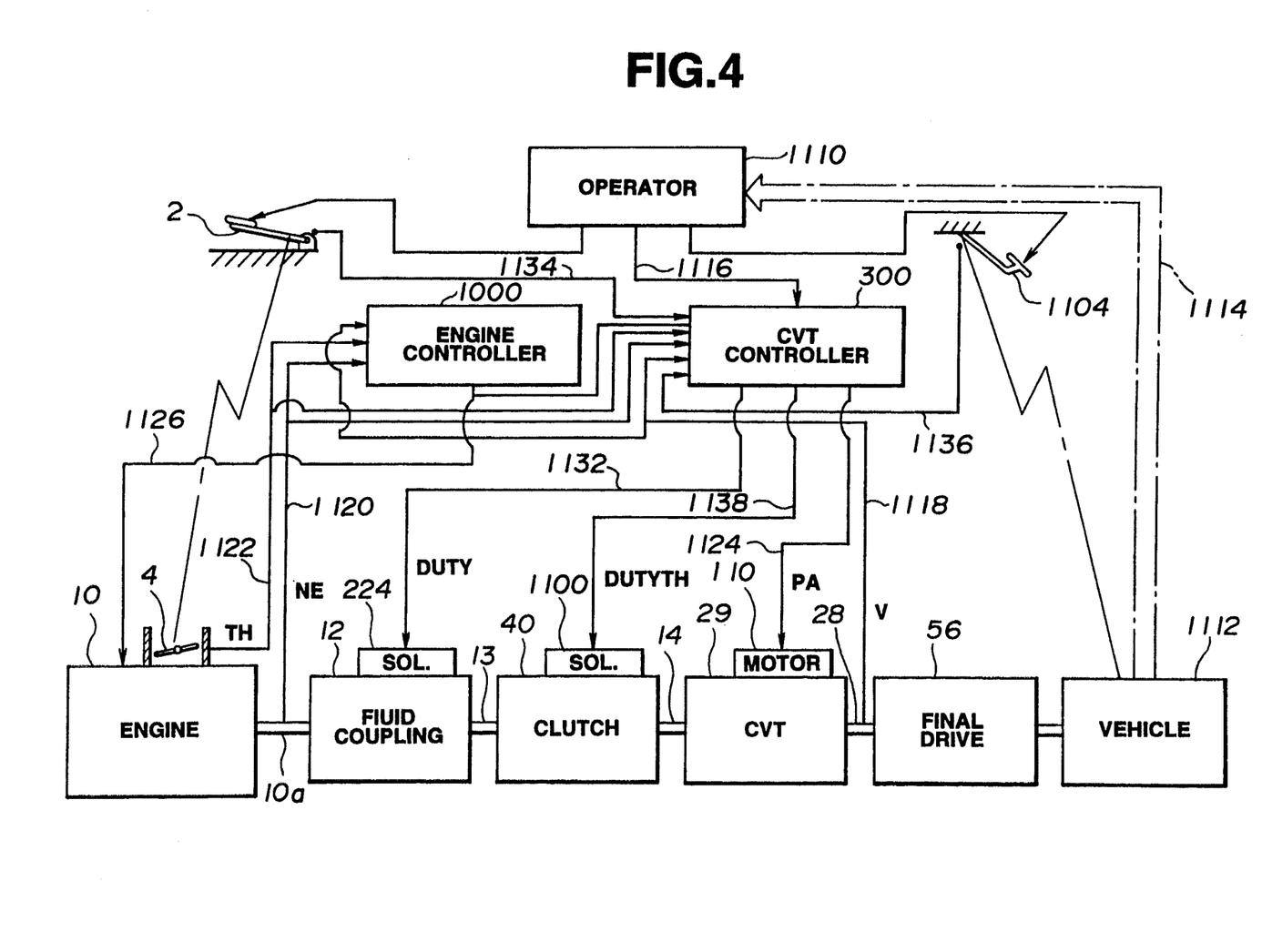
FIG. 4 is a block diagram showing the relationship between the engine controller, the CVT controller, the engine and the CVT.

Referring to FIG. 4, a box 1110 represents the vehicle operator, a box 1000 represents the engine controller, and a box 300 represents the CVT controller. The throttle 4 controls the torque output of the engine 10, which outputs its power through the engine output shaft 10a. The engine power is transferred to the fluid coupling 12 and then to an input shaft 13 of the forward clutch 40 of the forward/reverse change-over mechanism 15. When it is engaged, the forward clutch 40 is connected to the CVT input shaft 14. The forward clutch 40 need not to be positioned between the fluid coupling 12 and the CVT input shaft 14, and it may be positioned after the CVT 29. The CVT output shaft 28 transfers the engine's power to the final drive 56 which moves traction road wheels of the vehicle 1112.

The operator 1110 perceives the state of the vehicle 1112 through normal senses, represented by the feedback line 1114. The operator 1100 depresses or releases the gas pedal 2 sending a power output command to the throttle 4. The operator 1110 positions the manual selector valve 104 (see FIG. 2A) to send, via the shift position switch 304 (see FIG. 3), the shift position signal to the CVT controller 300 through line 1116.

The CVT controller 300 senses the states of the engine 10 and CVT 29 through lines 1118, 1120 and 1122. Line 1118 sends the vehicle speed signal (V) indicative of the revolution speed of the CVT output shaft 28 to the controller 300. Line 1120 sends the engine speed signal (NE) to the controller 300. Line 1122 sends the throttle opening signal (TH) to the controller 300. In response to the engine and CVT states, the controller 300 sends the control signal (PA) indicative of reduction ratio command through a 2O line 1124 to the CVT 29. The ratio command on the line 1124 controls the reduction ratio of the CVT 29 by controlling the stepper motor 110.

Figure 8:
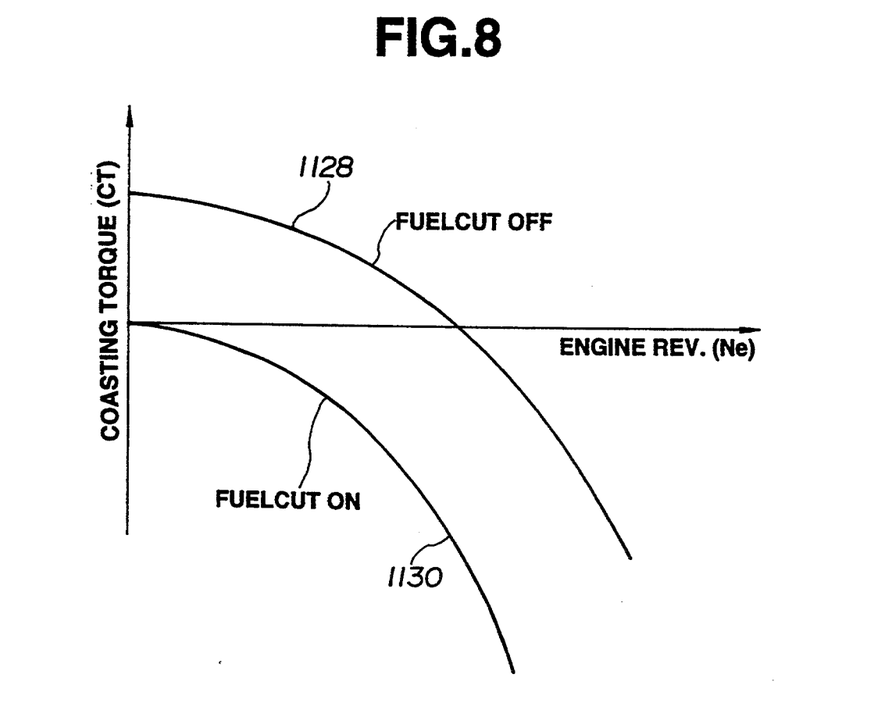
FIG. 8 is a coasting torque map representative of torque versus engine speed characteristics during coasting operation.

The engine controller 1000 senses the states of the engine 10 and the CVT 29 through lines 1120, 1122 and 1118. Lines 1118, 1120 and 1122 send the vehicle speed signal (V), the engine speed signal (NE) and throttle opening signal (TH) to the engine controller 1000. In response to the engine and CVT states, the engine controller 1000 sends the control signal indicative indicative of permitting a so-called fuelcut operation to be performed through a line 1126 to the engine 10. Fuel supply to at least some of the cylinders of the engine 10 is stopped during the fuelcut operation. FIG. 8 shows the relationship between the torque (CT) transmitted by the forward clutch 40 and the engine speed (NE) during coasting operation of the vehicle 1112. In FIG. 8, a curve 1128 shows the torque versus engine speed characteristic during coasting when the fuelcut operation is not performed in the engine 10, while a curve 1130 shows the torque versus engine speed characteristic during coasting when the fuelcut operation is performed in the engine 10.

The CVT controller 300 compares the vehicle speed indicative signal (V) with a lock-up on vehicle speed Von and a lock-up off vehicle speed Voff (Von>Voff) to determine whether the lock-up clutch 12d is to be engaged or disengaged. In detail, the CVT controller 300 determines that the duty of the solenoid 224 be 0% for disengagement of the lock-up clutch 12d or determines that the duty of the solenoid 224 be 100% for engagement of the lock-up clutch 12d. The CVT controller 300 sends the control signal (DUTY) indicative of the determined duty of the solenoid 224 through a line 1132 to the lock-up solenoid 224 for the fluid coupling 12.

Figure 9:
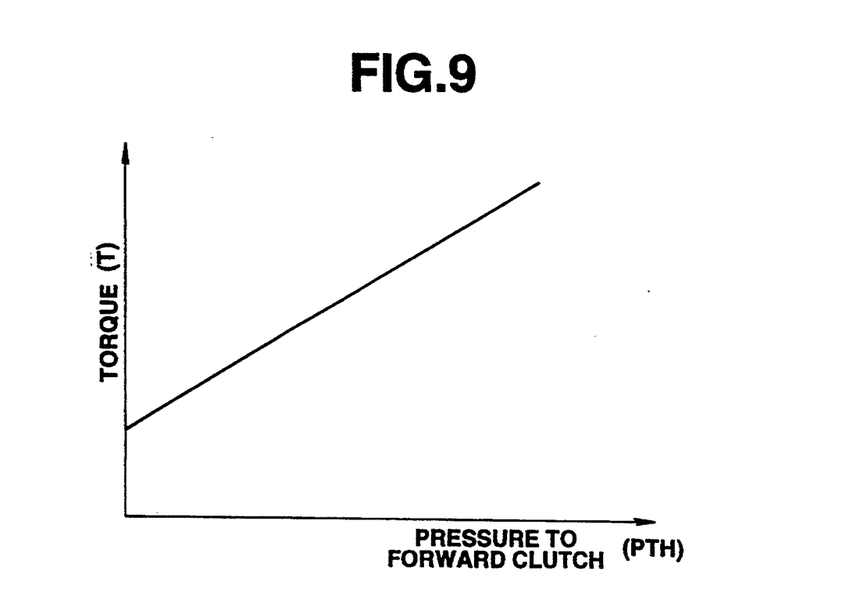
FIG. 9 is a clutch pressure map representative of a torque versus pressure characteristic of a forward clutch.

The CVT controller 300 also senses the states of the gas pedal 2 and foot brake 1104 through lines 1134 and 1136. Line 1134 sends the accelerator signal (ACC) indicative of whether the gas pedal 2 is depressed or released to the CVT controller 300. Line 1136 sends the brake signal (BRK) indicative of whether the foot brake 1104 is depressed or not to the CVT controller 300. In response to information derived from these signals, the CVT controller 300 determines the initiation of and the termination of a predetermined period of time when there is increased possibility that the traction road wheels of the vehicle 1112 are locked in accordance with the control diagrams shown in FIGS. 6 and 7. The CVT controller 300 senses the state of the engine 10 the lines 1120 and 1126. Line 1126 sends the signal indicative of whether the fuelcut operation is performed or not performed to the CVT controller 300. In response to the engine speed (NE), the CVT controller 300 determine a torque, so called a coasting torque (CT), for the state of the engine 10 by, for example, performing a table look-up operation of FIG. 8. The CVT controller 300 determines the magnitude of the coasting torque (CT) and determines hydraulic pressure (PTH) to be supplied to the forward clutch 40 by, for example, performing a table look-up operation of FIG. 9 based on the determined magnitude of the coasting torque (CT). FIG. 9 shows the torque versus pressure characteristic of the forward clutch 40. The CVT controller 300 determines duty (DUTYTH) of the clutch control solenoid 1100 by, for example, performing a table look-up operation of FIG. 10 based on the determined pressure (PTH) and sends the control signal in response to the desired torque represented by the determined duty (DUTYTH) through a line 1138 to the clutch control solenoid 1100. FIG. 10 shows a conversion map representing the relationship between duty of the clutch control solenoid 1100 and hydraulic pressure (PTH) generated by the throttle valve 114 (see FIG. 5).

The present invention is further explained with reference to FIGS. 6 and 7.

Figure 6:
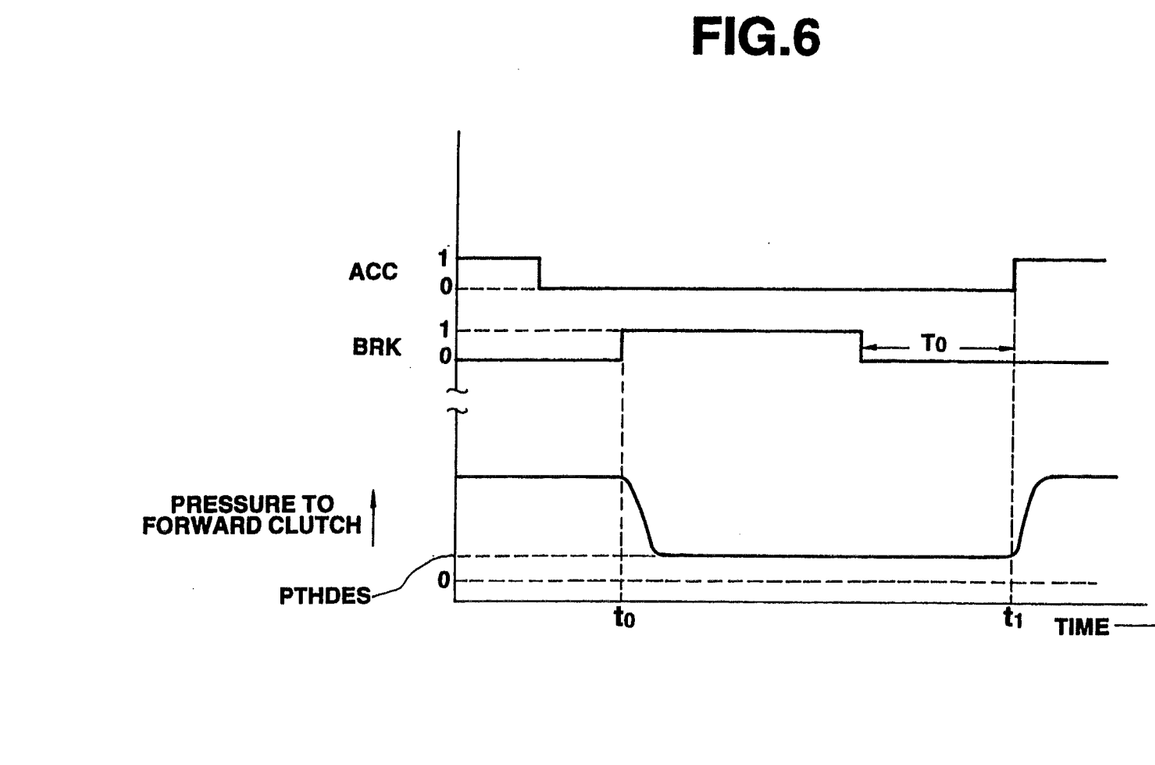
FIG. 6 is a signal timing diagram.

Referring to FIG. 6, let us now assume that the foot brake 1104 is depressed and thus applied at a moment $t_0$ after the gas pedal 2 has been released. Release of the gas pedal 2 causes the accelerator signal ACC to change from "1" level to "0" level. Depression of the foot brake 1104 causes the brake signal (BRK) to change from "0" level to "1" level Upon or immediately after depression of the foot brake 1104 (at the moment $t_0$), the CVT controller 300 determines the initiation of the predetermined period of time and starts controling the duty (DUTYTH) of the clutch control solenoid 1110 to adjust the hydraulic pressure (PTH) to a value (PTHDES) which causes the forward clutch 40 to transmit the magnitude of torque determined in accordance with the map in FIG. 8. This causes a drop in pressure to the level of PTHDES, causing the capacity of the forward clutch 40 to drop to such a level as to ensure transmission of torque produced in the drivetrain during coasting operation of the vehicle 1112. The hydraulic pressure (PTH) generated by the throttle valve 114 and supplied to the forward clutch 40 is kept low until the CVT controller 300 determines the termination of the predetermined period of time. In the case represented by FIG. 6, the CVT controller 300 determines the termination of the predetermined period of time at a moment $t_0$ upon elapse of a predetermined period of time $T_0$ after release of the foot brake 1104 since the gas pedal 2 is kept released. Release of the foot brake 1104 is recognized by the CVT controller 300 upon a change of the brake signal (BRK) from the "1" level to "0" level. Upon or immediately after the momenet $t_1$, the CVT controller 300 stops controlling the duty (DUTYTH) and set 0% as the duty (DUTYTH) of the clutch control solenoid 1100, thereby allowing the hydraulic pressure (PTH) to increase and resume the normal level.

Figure 7:
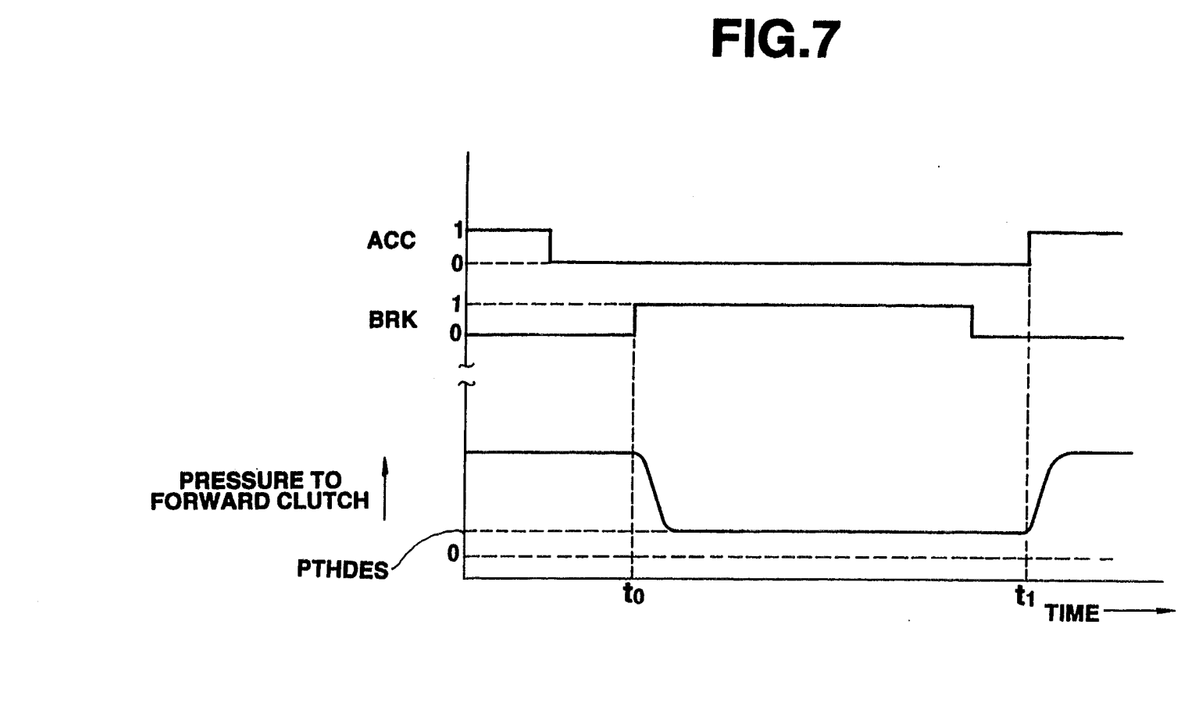
FIG. 7 is a signal timing diagram.

FIG. 7 represents another case. In this case, the CVT controller 300 determines the termination of the predetermined period of time at a moment $t_0$ upon depression of the gas pedal 2 after release of the foot brake 1104 but prior to elapse of the predetermined period of time To.

From the preceding description, it will be noted that during the predetermined period of time between the moments $t_0$ and $t_1$, the torque which the CVT 29 is subject to is held lower than the level determined by the map in FIG. 8 which represents the torque versus engine speed characteristic of the drivetrain during coasting operation. This is effective in preventing occurrence of a slip in the CVT 29, i.e., a slip of the V-belt 26, even if the traction road wheels of the vehicle 1112 are locked owing mainly to application of the foot brake 1104 to hold the CVT output shaft 28 stationary.

Since the CVT controller 300 determines the initiation of the predetermined period of time upon depression of the foot brake 1104 and starts controlling the clutch control solenoid 1100, the hydraulic pressure within the forward clutch 40 can drop sufficiently by the time the traction road wheels of the vehicle 1112 are locked owing to brake operation initiated by the depression of the foot brake 1104.

According to this clutch control, since the forward clutch 40 is being kept engaged to produce a torque as small as the coasting torque (CT), there occurs no substantial shock upon resumption of firm engagement of the forward clutch 40. Besides, so-called power loss feel is avoided during coasting operation of the vehicle 1112.

Another advantage derived from this control is that each of the traction road wheels can quickly resume a turning state from a locked state during anti-skid operation due to the fact that the forward clutch 40 is being engaged to produce a small torque during coasting. In order for quick resumption of turning of the traction road wheels, the engine may be controlled in a quick or fast idle state to produce increased torque.

The clutch control discussed above allows the lock-up clutch 12d to be kept engaged during coasting operation, thereby avoiding complexity of the lock-up control. In the case where the lock-up clutch 12d is kept engaged during coasting under the absence of the above-mentioned clutch control, the variation in torque appears at the lock-up clutch 12d. This torque variation is suppressed by the reduction in torque transmitting capacity of the forward clutch 42 performed by the clutch control according to the present invention. If this merit is to be gained, the CVT controller 300 should determine the initiation of the predetermined period of time upon release of the gas pedal 2 prior to depression of the foot brake 1104.

The initiation of the predetermined period of time may be determined by the CVT controller 300 upon recognizing that the vehicle 1112 starts passing a road surface with a low friction coefficient. This is made when a wheel acceleration, i.e., the first derivative, with respect to time, of a wheel speed, of the traction road wheels of the vehicle 1112 exceeds a predetermined acceleration value of 0.5 G. The magnitude of the predetermined acceleration value is set at 0.5 G because the wheel acceleration will not exceed 0.37 G when the vehicle runs along a down slope 40% below horizontal, while when the vehicle runs along a surface having a low friction coefficient as low as 0.1, the driving wheel starts turning at an acceleration above 0.5 G immediately after it restores its grip with the road surface. Referring to FIG. 4, the CVT controller 300 senses the state of the traction road wheels of the vehicle 1112 through the line 1118, which sends the vehicle speed signal (V) to the CVT controller 300. Since the CVT output shaft 28 rotates with the traction road wheels of the vehicle 1112, the vehicle speed signal (V) represents wheel revolution speed of the traction road wheels. The CVT controller 300 repeatedly input the vehicle speed signal and calculates the first time derivative of the wheel speed of the traction road wheels, and then repeatedly compares the calculated first time derivative with a predetermined value corresponding to 0.5 G. The CVT controller 300 determines the initiation of the predetermined period of time in response to the comparison.

Figure 11:
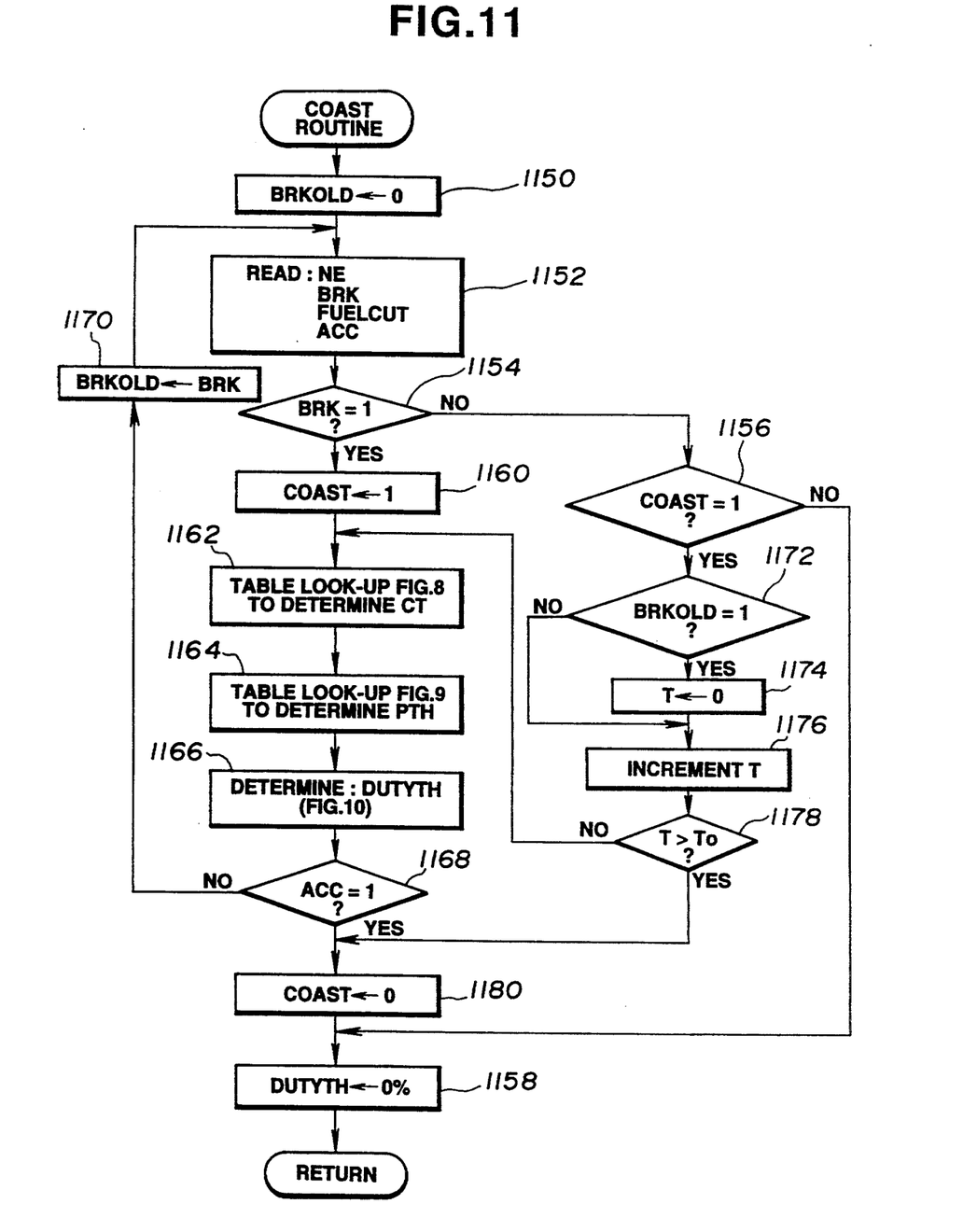
FIG. 11 is a flow diagram of a coast routine implementing the invention.

The flow diagram in FIG. 11 illustrates a coast routine of the preferred implementation of the present invention.

At a block 1150, the CVT controller 300 initialize BRKOLD by setting BKOLD equal to 0 (zero). Then, at the next block 1152, the CVT controller 300 inputs information of the states of engine 10 (engine speed NE and fuelcut), foot brake 1104 position and gas pedal 2 position. In this flow diagram, NE contains input data from the engine speed signal, BRK contains 0 (zero) if the input brake signal is 0 (zero) indicating that the foot brake 1104 is released and it contains 1 (one) if the input brake signal is 1 (one) indicating that the foot brake 1104 is depressed, FUELCUT contains 0 (zero) in response to absence of fuelcut operation in the engine 10 and it contains 1 (one) in response to presence of fuelcut operation in the engine 10, ACC contains 1 (one) if the input accelerator signal is 1 (one) indicating that the gas pedal 2 is depressed and it contains 0 (zero) if the input accelerator signal is 0 (zero) indicating that the gas pedal 2 is released.

The CVT controller 300 determines at a block 1154 whether BRK is equal to 1 (one) or not. If this is not the case, the controller 300 determines at a block 1156 whether a flag COAST is set or not. This flag COAST is initially reset so that the CVT controller 300 sets DUTYTH equal to 0% at a block 1158. Thus, the clutch control solenoid 1100 is deenergized. A flow of proceedings along the blocks 1150, 1152, 1154, 1156 and 1158 is repeated until the foot brake 1104 is depressed.

Immediately after the depression of the foot brake 1104, the CVT controller 300 determines at the block 1154 that BRK is equal to 1. Then, at the next block 1160, the CVT controller 300 sets the flag COAST. After setting the flag COAST, the CVT controller 300 proceeds along blocks 1162, 1164 and 1160 to determine DUTYTH. At the block 1162, a table look-up operation of the map shown in FIG. 8 is performed based on the FUELCUT and NE input at the block 1152. If FUELCUT contains 0 (zero), the data represented by the curve 1128 in FIG. 8 is retrieved to give a coasting torque CT for the given engine speed NE. If FUELCUT contains 1 (one), the data represented by the curve 1130 is retrieved to give a coasting torque CT for the given NE. The magnitude of the given coasting torque CT is calculated. Based on the magnitude of torque, a table look-up operation of the map shown in FIG. 9 is performed at the block 1164 to give a hydraulic pressure PTH for the given magnitude of torque. Then, at the next block 1166, the CVT controller 300 performs a table look-up operation of the conversion map shown in FIG. 10 to determine an appropriate percent of DUTYTH for the given PTH. At the next block 1168, the CVT controller 300 determines whether ACC is equal to 1 or not. If this is not the case, the CVT controller 300 updates the content of BROLD with that of BRK at a block 1170 before returning to the block 1152. The flow of proceedings along the blocks 1152, 1154, 1160, 1162, 1164, 1166, 1168 and 1170 is repeated until the foot brake 1104 is released or the gas pedal 2 is depressed.

If subsequently the foot brake 1104 is released, the CVT controller 300 determines at the block 1154 that BRK is not equal to 1 (one) and proceeds to the block 1156. Since the flag COAST is set, the CVT controller 300 proceeds to the next block 1172 to determined whether BRKOLD is equal to 1 or not. Since BRKOLD is equal to 1 immediately before release of the foot brake 1104, the CVT controller 300 resets timer T at the next block 1174. At the next block 1176, the timer T is increased by a predetermined value. At the next block 1178, the CVT controller 300 determines whether the timer T exceeds a predetermined period of time $T_0$ or not. If this in not the case, the CVT controller 300 proceeds to the block 1162. A flow of proceedings along the blocks 1152, 1154, 1156, 1172, 1174, 1176, 1178, 1162, 1164, 1166, 1168 and 1170 is repeated only once immediately after the foot brake 1104 is released with gas pedal 2 kept released. At the block 1170, the CVT controller 300 changes the content of BRKOLD to 0 (zero).

In the next run, since the BRKOLD is 0 (zero), the CVT controller 300 proceeds from the block 1172 directly to the block 1176 bypassing the block 1174. Thereafter, the CVT controller 300 proceeds along the blocks 1178, 1162, 1164, 1166, 1168, 1170, 1152, 1154, 1156 and 1172. This flow of proceedsings along the blocks 1176, 1178, 1162, 1164, 1166, 1168, 1170, 1152, 1154, 1156 and 1172 is repeated until T becomes greater than To (at the block 1178).

If the gas pedal 2 is depressed prior to elapse of the predetermined period of time To after the foot brake 1104 has been released, the repetition of execution of the flow of proceedings along the blocks 1176, 1178, 1162, 1164, 1166, 1168, 1170, 1152, 1154, 1156 and 1172 is terminated. At the block 1168, the CVT controller 300 determines that ACC is equal to 1 and then proceeds to a block 1180. At the block 1180, the CVT controller 300 resets the flag COAST and then sets DUTYTH eual to 0%.

If, at the block 1178, the CVT controller 300 determines that T is greater than To, the flag COAST is reset at the block 1180 and then the DUTYTH is set equal to 0% at the block 1158.

It is now understood that the DUTYTH is determined at the block 1166 to control the forward clutch 40, thereby to cause the clutch 40 to adjust its capacity to transmit the coasting torque as illustrated in the map in FIG. 8 during the predetermined period of time as illustrated in FIGS. 6 and 7.

What is claimed is:

1. In a vehicle drivetrain control system including an engine having a throttle which opens in degrees in response to depression of a gas pedal, a continuously variable transmission, a traction road wheel, brake means for decelerating the traction road wheel in response to depression of a foot brake, a clutch engageable in response to a clutch control signal, and controller means generating the clutch control signal to adjust the torque transmitted by the clutch, thereby controlling torque transmitted by the continuously variable transmission, the improvement wherein:

the controller means generates a desired torque command as a function of the engine speed, the function representing torque versus engine speed characteristic of the vehicle drivetrain during coasting operation;

the controller means determines the initiation of and the termination of a predetermined period of time when there is increased possibility that the traction road wheel is locked; and the controller means determines the control signal in response to the desired torque during the predetermined period of time.

2. The improvement as claimed in claim 1, wherein the controller means determines the initiation of the predetermined period of time upon depression of the foot brake.

3. The improvement as claimed in claim 2, wherein the controller means determines the termination of the predetermined period upon elapse of a predetermined time after release of the foot brake.

4. The improvement as claimed in claim 2, wherein the controller means determines the termination of the predetermined period of time upon depression of the gas pedal.

5. The improvement as claimed in claim 1, wherein the controller means determines that the traction road wheel has entered a slippery terrain; and the controller means determines the initiation of the predetermined period of time in response to the determination that the traction road wheel has entered a slippery terrain.

6. The improvement as claimed in claim 1, wherein the controller means determines the initiation of the predetermined period of time in response to an acceleration to which the traction road wheel exceeding a predetermined value after release of the gas pedal.

7. A control method for a vehicle drivetrain including an engine having a throttle which opens in degrees in response to depression of a gas pedal, a continuously variable transmission, a traction road wheel, brake means for decelerating the traction road wheel in response to depression of a foot brake, a clutch engageable in response to a clutch control signal, and controller means generating the clutch control signal to adjust the torque transmitted by the clutch, thereby controlling torque transmitted by the continuously variable transmission, the method control comprising the steps of:

generating a desired torque command as a function of the engine speed, the function representing torque versus engine speed characteristic of the vehicle drivetrain during coasting operation;

determining the initiation of and the termination of a predetermined period of time when there is increased possibility that the traction road wheel is locked; and determining the control signal in response to the desired torque during the predetermined period of time.

8. A control method for a vehicle drivetrain including an engine having a throttle which opens in degrees in response to depression of a gas pedal, a continuously variable transmission, a traction road wheel, brake means for decelerating the traction road wheel in response to depression of a foot brake, a clutch engageable in response to a clutch control signal, and controller means generating the clutch control signal to adjust the torque transmitted by the clutch, thereby controlling torque transmitted by the continuously variable transmission, the control method comprising the steps of:

determining the initiation of a predetermined period of time upon depression of the foot brake;

generating a desired torque command as a function of the engine speed, the function representing torque versus engine speed characteristic of the vehicle drivetrain during coasting operation; and determining the control signal in response to the desired torque during the predetermined period of time.

9. A control method as claimed in claim 8, including the step of:

determining the termination of the predetermined period upon elapse of a predetermined time after release of the foot brake.

10. A control method as claimed in claim 9, including the step of:

determining the termination of the predetermined period of time upon depression of the gas pedal.

11. A control method for a vehicle drivetrain including an engine having a throttle which opens in degrees in response to depression of a gas pedal, a continuously variable transmission, a traction road wheel, brake means for decelerating the traction road wheel in response to depression of a foot brake, a clutch engageable in response to a clutch control signal, and controller means generating the clutch control signal to adjust the torque transmitted by the clutch, thereby controlling torque transmitted by the continuously variable transmission, the control method comprising the steps of:

determining a wheel acceleration to which the traction road wheel is subject to after release of the gas pedal;

comparing the determined acceleration with a predetermined value;

determining the initiation of a predetermined period of time in response to the comparison;

generating a desired torque command as a function of the engine speed, the function representing torque versus engine speed characteristic of the vehicle drivetrain during coasting operation; and determining the control signal in response to the desired torque during the predetermined period of time.

* * * * *